United States Patent
Cao et al.

(10) Patent No.: US 11,829,693 B2
(45) Date of Patent: Nov. 28, 2023

(54) METHOD FOR OPTIMIZING CIRCUIT TIMING BASED ON FLEXIBLE REGISTER TIMING LIBRARY

(71) Applicant: SOUTHEAST UNIVERSITY, Nanjing (CN)

(72) Inventors: Peng Cao, Nanjing (CN); Jiahao Wang, Nanjing (CN); Haiyang Jiang, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/011,443

(22) PCT Filed: Mar. 9, 2022

(86) PCT No.: PCT/CN2022/079945
§ 371 (c)(1),
(2) Date: Dec. 19, 2022

(87) PCT Pub. No.: WO2023/015878
PCT Pub. Date: Feb. 16, 2023

(65) Prior Publication Data
US 2023/0214567 A1   Jul. 6, 2023

(30) Foreign Application Priority Data

Aug. 9, 2021  (CN) .......................... 202110906714.9

(51) Int. Cl.
*G06F 30/3315* (2020.01)
*G06F 30/337* (2020.01)
*G06F 119/12* (2020.01)

(52) U.S. Cl.
CPC ........ *G06F 30/3315* (2020.01); *G06F 30/337* (2020.01); *G06F 2119/12* (2020.01)

(58) Field of Classification Search
CPC . G06F 30/3315; G06F 30/337; G06F 2119/12
See application file for complete search history.

(56) References Cited

U.S. PATENT DOCUMENTS 6,336,205 B1   1/2002  Kurokawa et al.

FOREIGN PATENT DOCUMENTS

| CN | 1985257 A   | 6/2007 |
|----|-------------|--------|
| CN | 103324774 A | 9/2013 |

(Continued)

OTHER PUBLICATIONS

International Search Report (with English translation)and Written Opinion dated Apr. 28, 2022 issued in corresponding International Application No. PCT/CN2022/079945.

(Continued)

*Primary Examiner* — Jack Chiang
*Assistant Examiner* — Aric Lin
(74) *Attorney, Agent, or Firm* — Muncy, Geissler, Olds & Lowe, P.C.

(57) ABSTRACT

Disclosed in the present invention is a method for optimizing circuit timing based on a flexible register timing library. First, registers are simulated respectively in a case of a plurality of groups of an input signal conversion time, a clock signal conversion time, and a register load capacitance, corresponding actual propagation delays at this time are obtained by changing setup slack and hold slack of the registers, and actual propagation delays of the registers under specific input signal conversion time, clock signal conversion time, register load capacitances, setup slack, and hold slack are obtained through linear interpolation, to establish a flexible register timing library; and then static timing analysis is performed on all register paths in a circuit by using the library, a minimum clock cycle under a condition of satisfying that a setup time margin and a hold time (Continued)

margin are both greater than zero is found by changing the setup slack and hold slack of the registers, thereby improving the performance of the circuit without changing the design of the circuit and without increasing the area overheads of the circuit.

4 Claims, 2 Drawing Sheets

(56) References Cited

FOREIGN PATENT DOCUMENTS

| CN | 103632001 A | 3/2014 |
|---|---|---|
| CN | 105138774 A | 12/2015 |
| CN | 113673193 A | 11/2021 |

OTHER PUBLICATIONS

Decision to Grant a Patent dated Oct. 21, 2022 issued in corresponding China Application No. 202110906714.9 (with English translation).

METHOD FOR OPTIMIZING CIRCUIT TIMING BASED ON FLEXIBLE REGISTER TIMING LIBRARY

TECHNICAL FIELD

The present invention relates to a method for optimizing digital integrated circuit timing, belonging to the field of EDA technology.

BACKGROUND

Static timing analysis is an important step of verifying whether a circuit timing constraint is satisfied in a digital integrated circuit. When static timing analysis is performed by using a conventional register timing library, a propagation delay of a register is considered unrelated to a setup time (a shortest time within which input data needs to be kept stable before a clock signal jump) and a hold time (a shortest time within which the input data needs to be kept stable after the clock signal jump). The propagation delay, the setup time, and the hold time are uniquely determined by an input signal conversion time, a clock signal conversion time, and a register load capacitance of the register. However, in an actual case, for a specific input signal conversion time, clock signal conversion time, and register load capacitance, the propagation delay of the register is related to setup slack (a time within which the input data is actually kept stable before the clock signal jump) and hold slack (a time within which the input data is actually kept stable after the clock signal jump). A register timing library established taking the correlation among the three into consideration is referred to as a flexible register timing library. In the library, when the setup slack and the hold slack are changed, an actual propagation delay of the register changes accordingly.

When static timing analysis is performed on the digital integrated circuit by using the conventional register timing library, that is, when the propagation delay of the register is considered unrelated to the setup time and the hold time, the setup time, the hold time, and the propagation delay in the conventional register timing library determine whether all register paths in the circuit satisfy a setup time check and a hold time check. In a case that a condition of the setup time check of all the register paths is satisfied, a minimum clock cycle required for correct circuit timing is determined. If the minimum clock cycle (corresponding to the highest operating frequency) does not satisfy design requirements, the circuit needs to be optimized, leading to extra design iteration time and circuit area overheads.

SUMMARY

Inventive objective: In view of the foregoing existing technology, a method for optimizing circuit timing based on a flexible register timing library is provided, to satisfy a setup time check and a hold time check by using a shorter clock cycle, thereby improving the performance of the circuit without changing the design of the circuit and without increasing the area overheads of the circuit.

Technical solution: A method for optimizing circuit timing based on a flexible register timing library, where a setup time $T_{setup}$, a hold time $T_{hold}$, and a propagation delay $T_{cq}$ of a register respectively refer to a shortest time within which input data needs to be kept stable before a clock signal jump, a shortest time within which the input data needs to be kept stable after the clock signal jump, and a time interval from the clock signal jump to output data under a specific combination of an input signal conversion time $S_{data}$, a clock signal conversion time $S_{ck}$, and a register load capacitance $C_L$ in a conventional register timing library;

setup slack $T_{setup}^s$, hold slack $T_{hold}^s$, and an actual propagation delay $T_{cq}^s$ of the register respectively refer to a time within which the input data is actually kept stable before the clock signal jump, a time within which the input data is actually kept stable after the clock signal jump, and a time interval from the clock signal jump to the output data in a case of specific setup slack $T_{setup}^s$ and hold slack $T_{hold}^s$ under the specific combination of the input signal conversion time $S_{data}$, the clock signal conversion time $S_{ck}$, and the register load capacitance $C_L$;

the flexible register timing library refers to a plurality of corresponding different combinations of the setup slack $T_{setup}^s$, the hold slack $T_{hold}^s$, and the actual propagation delay $T_{cq}^s$ under the specific combination of the input signal conversion time $S_{data}$, the clock signal conversion time $S_{ck}$, and the register load capacitance $C_L$;

a register path refers to a data path with registers as a start point and an end point in a circuit, where a start point register is denoted as $FF^i$, an end point register is denoted as $FF^j$, i and j are respectively sequence numbers of the start point register and the end point register, $1 \le i, j \le N_{FF}$, and $N_{FF}$ is a quantity of registers in the circuit;

for a register path between the start point register $FF^i$ and the end point register $FF^j$, a setup time margin $S_{setup}^{(i,j)}$ and a hold time margin $S_{hold}^{(i,j)}$ based on the conventional register timing library are respectively (1) and (2) as follows:

$$S_{setup}^{(i,j)} = T_{ck}^{(j)} + T - T_{setup}^{(j)} - T_{ck}^{(i)} - T_{cq}^{(i)} - T_{path}^{(i,j)max} \quad (1), \text{ and}$$

$$S_{hold}^{(i,j)} = T_{ck}^{(i)} + T_{cq}^{(i)} + T_{path}^{(i,j)min} - T_{ck}^{(j)} - T_{hold}^{(j)} \quad (2),$$

where T represents a clock cycle, $T_{ck}^{(i)}$ and $T_{ck}^{(j)}$ respectively represent a time for a clock signal to reach the start point register FE and a time for the clock signal to reach the end point register $FF^j$, $T_{path}^{(i,j)max}$ and $T_{path}^{(i,j)min}$ respectively represent the start point register $FF^i$ and the end point register $FF^j$ between a maximum delay and a minimum delay of the data path in all register paths, $T_{setup}^{(j)}$ and $T_{hold}^{(j)}$ respectively represent a setup time and a hold time of the end point register $FF^j$, and $T_{cq}^{(i)}$ represents a propagation delay of the start point register $FF^i$;

for the register path between the start point register $FF^i$ and the end point register $FF^j$, a setup time margin $S_{setup}^{(i,j)s}$ and a hold time margin $S_{hold}^{(i,j)s}$ based on the flexible register timing library are respectively (3) and (4) as follows:

$$S_{setup}^{(i,j)s} = T_{ck}^{(j)} + T - T_{setup}^{(j)s} - T_{ck}^{(i)} - T_{cq}^{(i)s} - T_{path}^{(i,j)max} \quad (3), \text{ and}$$

$$S_{hold}^{(i,j)s} = T_{ck}^{(i)} + T_{cq}^{(i)s} + T_{path}^{(i,j)min} - T_{ck}^{(j)} - T_{hold}^{(j)s} \quad (4),$$

where $T_{setup}^{(j)s}$, and $T_{hold}^{(j)s}$ respectively represent setup slack and hold slack of the end point register $FF^j$, and $T_{cq}^{(i)s}$ represents an actual propagation delay of the start point register $FF^i$, and changes along with the setup slack and the hold slack of the register; and the method includes:

S1: for all registers in the circuit, determining ranges of the input signal conversion time $S_{data}$, the clock signal conversion time $S_{ck}$, and the register load capacitance $C_L$ of the registers, selecting a plurality of combinations of the input signal conversion time, the clock signal conversion time, and the register load capacitance from the ranges, and performing simulation to obtain all valid setup slack and hold slack, and corresponding actual propagation delays; and S2: for all register paths in the circuit, changing the setup slack and the hold slack of each of the start point registers and end point registers according to the input signal conversion time $S_{data}$, the clock signal conversion time $S_{ck}$, and the register load capacitance $C_L$, of the start point register or the end point register, and minimizing the clock cycle in a case that it is satisfied that the setup time margin and the hold time margin of each register path based on the flexible register timing library are both greater than zero.

Beneficial effects: For the method for optimizing circuit timing based on a flexible register timing library in the present invention, first, in the present invention, to represent the correlation among setup slack, hold slack, and an actual propagation delay of a register, on the basis of simulation by changing the setup slack and the hold slack of the register to obtain a corresponding actual propagation delay, actual propagation delays under different setup slack and hold slack are obtained by using a linear interpolation method. Compared with a conventional register timing library, through the representation of the correlation among the three, timing features of the register can be reflected more comprehensively, thereby providing reference for timing optimization. Next, in the present invention, with the use of the correlation among setup slack, hold slack, and the actual propagation delay, static timing analysis is performed on a register path in a circuit. Compared with a static timing analysis method based on a conventional register timing library, the present invention can full use setup time margins and hold time margins of adjacent register paths, and while satisfying that setup time margins and hold time margins of all register paths are greater than zero, a clock cycle is reduced to minimum, thereby improve circuit performance.

DETAILED DESCRIPTION

Figure 1:
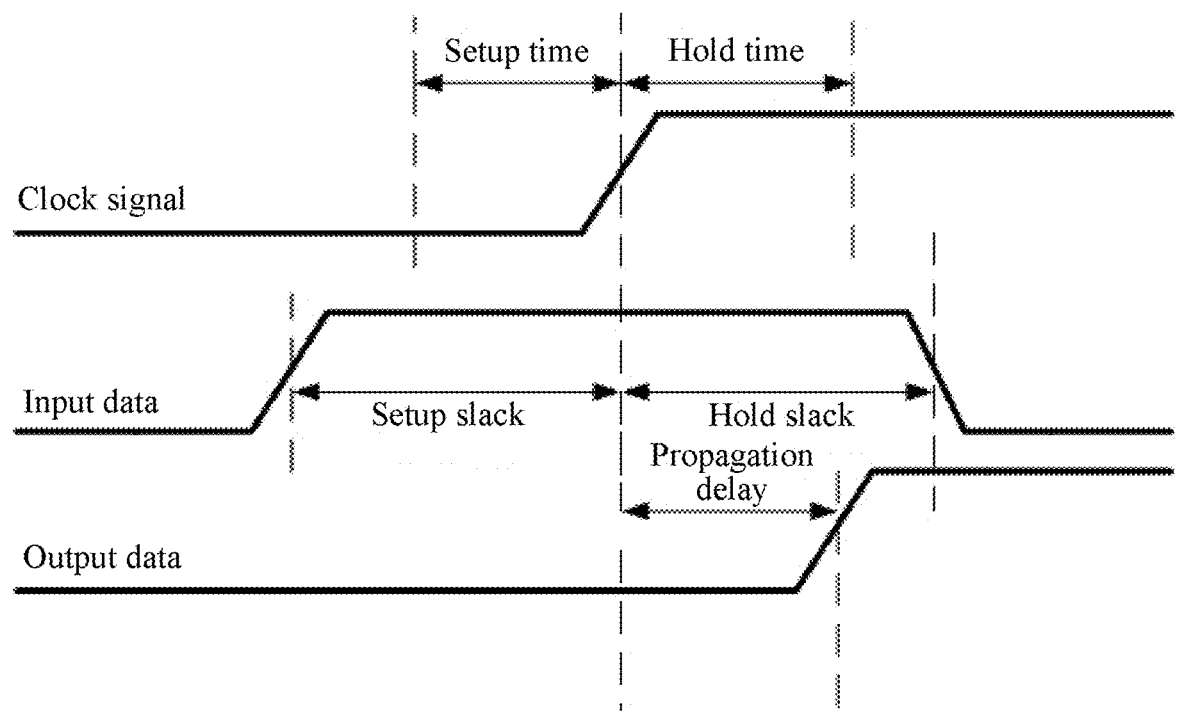
FIG. 1 is a schematic diagram register of a setup time, a hold time, setup slack, hold slack, and a propagation delay.
Figure 2:
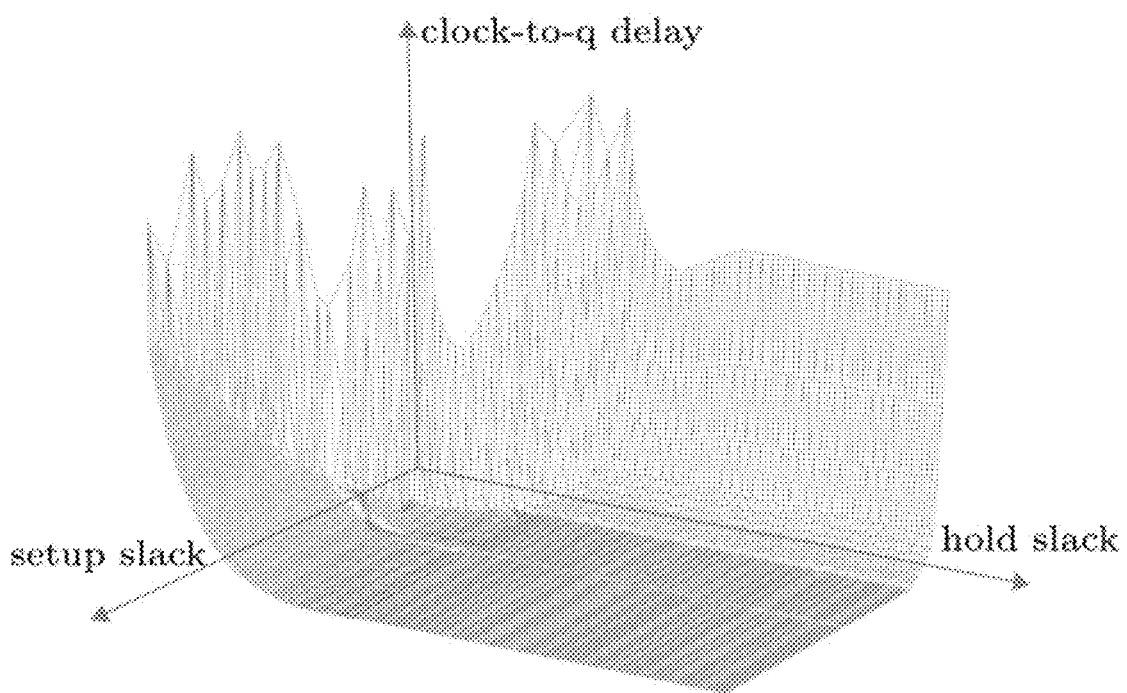
FIG. 2 is a schematic diagram of the correlation among setup slack (setup slack), hold slack (hold slack), and an actual propagation delay (clock-to-q delay) of a register.

The present invention is further described below with reference to the accompanying drawings.

A method for optimizing circuit timing based on a flexible register timing library, where a setup time $T_{setup}$, a hold time $T_{hold}$, and a propagation delay $T_{cq}$ of a register respectively refer to a shortest time within which input data needs to be kept stable before a clock signal jump, a shortest time within which the input data needs to be kept stable after the clock signal jump, and a time interval from the clock signal jump to output data under a specific combination of an input signal conversion time $S_{data}$, a clock signal conversion time $S_{ck}$, and a register load capacitance $C_L$ in a conventional register timing library.

Setup slack $T_{setup}^s$, hold slack $T_{hold}^s$, and an actual propagation delay $T_{cq}^s$ of the register respectively refer to a time within which the input data is actually kept stable before the clock signal jump, a time within which the input data is actually kept stable after the clock signal jump, and a time interval from the clock signal jump to the output data in a case of specific setup slack $T_{setup}^s$ and hold slack $T_{hold}^s$ under the specific combination of the input signal conversion time $S_{data}$, the clock signal conversion time $S_{ck}$, and the register load capacitance $C_L$.

The flexible register timing library refers to a plurality of corresponding different combinations of the setup slack $T_{setup}^s$, the hold slack $T_{hold}^s$, and the actual propagation delay $T_{cq}^s$ under the specific combination of the input signal conversion time $S_{data}$, the clock signal conversion time $S_{ck}$, and the register load capacitance $C_L$.

A register path refers to a data path with registers as a start point and an end point in a circuit, where a start point register is denoted as $FF^i$, an end point register is denoted as $FF^j$, i and j are respectively sequence numbers of the start point register and the end point register, $1 \leq i, j \leq N_{FF}$, and $N_{FF}$ is a quantity of registers in the circuit.

For a register path between the start point register $FF^i$ and the end point register $FF^j$, a setup time margin $S_{setup}^{(i,j)}$ and a hold time margin $S_{hold}^{(i,j)}$ based on the conventional register timing library are respectively (1) and (2) as follows:

$$S_{setup}^{(i,j)} = T_{ck}^{(j)} + T - T_{setup}^{(j)} - T_{ck}^{(i)} - T_{cq}^{(i)} - T_{path}^{(i,j)max} \quad (1), \text{ and}$$

$$S_{hold}^{(i,j)} = T_{ck}^{(i)} + T_{cq}^{(i)} + T_{path}^{(i,j)min} - T_{ck}^{(j)} - T_{hold}^{(j)} \quad (2),$$

where T represents a clock cycle, $T_{ck}^{(i)}$ and $T_{ck}^{(j)}$ respectively represent a time for a clock signal to reach the start point register FE and a time for the clock signal to reach the end point register $FF^j$, $T_{path}^{(i,j)max}$ and $T_{path}^{(i,j)min}$ respectively represent the start point register $FF^i$ and the end point register $FF^j$ between a maximum delay and a minimum delay of the data path in all register paths, $T_{setup}^{(j)}$ and $T_{hold}^{(j)}$ respectively represent a setup time and a hold time of the end point register $FF^j$, and $T_{cq}^{(i)}$ represents a propagation delay of the start point register $FF^i$.

For the register path between the start point register $FF^i$ and the end point register $FF^j$, a setup time margin $S_{setup}^{(i,j)s}$ and a hold time margin $S_{hold}^{(i,j)s}$ based on the flexible register timing library are respectively (3) and (4) as follows:

$$S_{setup}^{(i,j)s} = T_{ck}^{(j)} + T - T_{setup}^{(j)s} - T_{ck}^{(i)} - T_{cq}^{(i)s} - T_{path}^{(i,j)max} \quad (3), \text{ and}$$

$$S_{hold}^{(i,j)s} = T_{ck}^{(i)} + T_{cq}^{(i)s} + T_{path}^{(i,j)min} - T_{ck}^{(j)} - T_{hold}^{(j)s} \quad (4),$$

where $T_{setup}^{(j)s}$, and $T_{hold}^{(j)s}$ respectively represent setup slack and hold slack of the end point register $FF^j$, and $T_{cq}^{(i)s}$ represents an actual propagation delay of the start point register $FF^i$, and changes along with the setup slack and the hold slack of the register; and The method for optimizing circuit timing based on a flexible register timing library includes:

S1: For all registers in the circuit, determine ranges of the input signal conversion time $S_{data}$, the clock signal conversion time $S_{ck}$, and the register load capacitance $C_L$ of the registers, select a plurality of combinations of the input signal conversion time, the clock signal conversion time, and the register load capacitance from the ranges, and perform simulation to obtain all valid setup slack and hold slack, and corresponding actual propagation delays.

S2: For all register paths in the circuit, change the setup slack and the hold slack of each of the start point registers and end point registers according to the input signal conversion time $S_{data}$, the clock signal conversion time $S_{ck}$, and the register load capacitance $C_L$ of the start point register or the end point register, and minimize the clock cycle in a case that it is satisfied that the setup time margin and the hold time margin of each register path based on the flexible register timing library are both greater than zero.

In step S1, for each combination of the input signal conversion time, the clock signal conversion time, and the register load capacitance in the conventional register timing library, it is determined that valid ranges of the setup slack $T_{setup}^s$ and the hold slack $T_{hold}^s$ are $T_{setup}^{s(min)} \leq T_{setup}^s \leq T_{setup}^{s(max)}$ and $T_{hold}^{s(min)} \leq T_{hold}^s \leq T_{hold}^{s(max)}$, and a specific method is: first, performing simulation by taking sufficiently large values of the setup slack $T_{setup}^s$ and the hold slack $T_{hold}^s$ to obtain a corresponding actual propagation delay $T_{cq}^s$, where the sufficiently large value refers to that $T_{cq}^s$ no longer decreases when $T_{setup}^s$ or $T_{hold}^s$ continues to increase; then, performing simulation by keeping $T_{hold}^s$ unchanged and reducing $T_{setup}^s$ until $T_{cq}^s$ starts to increase, where in this case, corresponding $T_{setup}^s$ is $T_{setup}^{s(max)}$; performing simulation by keeping $T_{setup}^s$ unchanged and reducing $T_{hold}^s$ until $T_{cq}^s$ starts to increase, where in this case, corresponding $T_{hold}^s$ is $T_{hold}^{s(max)}$; then, performing simulation by keeping continuing to reduce $T_{hold}^s$, where $T_{cq}^s$ continues to increase until simulation fails, that is, the output data cannot be obtained during the clock signal jump of the register, and in this case, corresponding $T_{setup}^s$ is $T_{setup}^{s(min)}$; and performing simulation by keeping $T_{setup}^s$ unchanged and continuing to reduce $T_{hold}^s$, where $T_{cq}^s$ continues to increase until simulation fails, and in this case, corresponding $T_{hold}^s$ is $T_{hold}^{s(min)}$.

In step S1, for each combination of the input signal conversion time, the clock signal conversion time, and the register load capacitance in the conventional register timing library, simulation is performed in the valid ranges of $T_{setup}^s$ and $T_{hold}^s$ to obtain corresponding $T_{cq}^s$ under all valid combinations of $T_{setup}^s$ and $T_{hold}^s$, and a specific method is: first, selecting simulation points from the valid ranges of $T_{setup}^s$ and $T_{hold}^s$ with $T_{step}$ as an interval, where $N_{setup}$ $T_{setup}^s$ simulation points are provided, and are respectively $T_{setup}^{s(min)} + n_{setup} \times T_{step}$, where $0 \leq n_{setup} \leq N_{setup} - 1$, $n_{setup}$ is an $n^{th}$ $T_{setup}^s$ simulation point, $N_{setup}$ is a maximum positive integer satisfying $T_{setup}^{s(min)} + (N_{setup} - 1) \times T_{step} \leq T_{setup}^{s(max)}$, $N_{hold}$ $T_{hold}^s$ simulation points are provided, and are respectively $T_{hold}^{s(min)} + n_{hold} \times T_{hold}$, where $0 \leq n_{hold} \leq N_{hold} - 1$, $n_{hold}$ is an $n^{th}$ $T_{hold}^s$ simulation point, and $N_{hold}$ is a maximum positive integer satisfying $T_{hold}^{s(min)} + (N_{hold} - 1) \times T_{step} \leq T_{hold}^{s(max)}$; and then, combining the $N_{setup}$ $T_{setup}^s$ simulation points and the $N_{hold}$ $T_{hold}^s$ simulation points two by two, and performing simulation under all combinations to obtain corresponding $T_{cq}^s$.

In step S2, for all register paths in the circuit, timing analysis is performed by using the conventional register timing library, to obtain the clock cycle T of the circuit, and for the register path between the start point register $FF^i$ and the end point register $FF^j$, the setup time margin $S_{setup}^{(i,j)}$ and the hold time margin $S_{hold}^{(i,j)}$, the maximum delay $T_{path}^{(i,j)max}$ and the minimum delay $T_{path}^{(i,j)min}$ of the data path, the setup time $T_{setup}^{(j)}$ and the hold time $T_{hold}^{(j)}$ of the end point register $FF^j$, a propagation delay $T_{cq}^{(i)}$ of the start point register $FF^i$, an input signal conversion time $S_{data}^{(i)}$, a clock signal conversion time $S_{ck}^{(i)}$, and a load capacitance $C_L^{(i)}$ of the start point register $FF^i$, and an input signal conversion time $S_{data}^{(j)}$, the clock signal conversion time $S_{ck}^{(j)}$, and the load capacitance $C_L^{(j)}$ of the end point register j are obtained.

When setup slack and hold slack of the start point register $FF^i$ obtained by performing interpolation calculation according to all the input signal conversion time, clock signal conversion time, and register load capacitances in the conventional register timing library and all the valid setup slack and hold slack and the corresponding actual propagation delays obtained through simulation in step S1 are respectively $T_{setup}^{(i)s}$ and $T_{hold}^{(i)s}$, the corresponding actual propagation delay is $T_{cq}^{(i)s}$ and a specific process is:

first, an input signal conversion time $\underline{S}_{data}$ that is closest to $S_{data}^{(i)}$ and is less than $S_{data}^{(i)}$, a clock signal conversion time $\underline{S}_{ck}$ that is closest to $S_{ck}^{(i)}$ and is less than $S_{ck}^{(i)}$, and a load capacitance $\underline{C}_L$ that is closest to $C_L^{(i)}$ and is less than $C_L^{(i)}$ in the conventional register timing are selected; and an input signal conversion time $\overline{S}_{data}$ that is closest to $S_{data}^{(i)}$ and is greater than $S_{data}^{(i)}$, a clock signal conversion time $\overline{S}_{ck}$ that is closest to $S_{ck}^{(i)}$ and is greater than $S_{ck}^{(i)}$, and a load capacitance $\overline{C}_L$ that is closest to $C_L^{(i)}$ and is greater than $C_L^{(i)}$ in the conventional register timing are selected;

then, when the setup slack and the hold slack of the register $FF^i$ are respectively $T_{setup}^{(i)s}$ and $T_{hold}^{(i)s}$, setup slack $\underline{T}_{setup}^s$ that is closest to $T_{setup}^{(i)s}$ and is less than $T_{setup}^{(i)s}$ in the $N_{setup}$ $T_{setup}^s$ simulation points is selected, and setup slack $\underline{T}_{hold}^s$ that is closest to $T_{hold}^{(i)s}$ and is less than $T_{hold}^{(i)s}$ in the $N_{hold}$ $T_{hold}^s$ simulation points is selected; and setup slack $\underline{T}_{setup}^s$ that is closest to $T_{setup}^{(i)s}$ and is greater than $T_{setup}^{(i)s}$ in the $N_{setup}$ $T_{setup}^s$ simulation points is selected, and setup slack $\underline{T}_{hold}^s$ that is closest to $T_{hold}^{(i)s}$ and is greater than $T_{hold}^{(i)s}$ in the $N_{hold}$ $T_{hold}^s$ simulation points is selected; and finally the corresponding actual propagation delay $T_{cq}^{(i)s}$ of the register FE when the input signal conversion time is $S_{data}^{(i)}$, the clock signal conversion time is $S_{ck}^{(i)}$, the register load capacitance is $C_L^{(i)}$, the setup slack is $T_{setup}^{(i)s}$, and the hold slack $T_{hold}^{(i)s}$ is obtained in a linear interpolation mode according to the actual propagation delays of the register in a total of 32 cases in which the input signal conversion time is respectively $\underline{S}_{data}$ and $\overline{S}_{data}$, the clock signal conversion time is respectively $\underline{S}_{ck}$ and $\overline{S}_{ck}$, the register load capacitance is respectively $\underline{C}_L$ and $\overline{C}_L$, the setup slack is respectively $\underline{T}_{setup}^s$, and $\overline{T}_{setup}^s$, and the hold slack is respectively $\underline{T}_{hold}^s$ and $\overline{T}_{hold}^s$.

The linear interpolation mode is specifically:

a first step: each combination of the 32 combinations and a target combination are considered as one spatial coordinate, any two spatial coordinates at most has four same coordinate values, propagation delays of the register corresponding to two coordinates in this case are denoted as $T_{cq}^t$, and $T_{cq}^{t+1}$, one-dimensional linear interpolation is performed on each pair in a different dimension of the coordinate values, the pair are respectively denoted as $x_t^1$ and $x_{t+1}^1$, in the different dimension, and $x^1$ is used to represent a coordinate value of the target combination in the dimension, to obtain a new interpolation coordinate and a delay $T_{cq}^{1-i}$ of the register corresponding to the interpolation coordinate, $1 \leq i \leq 16$, and the formula is as follows:

$$T_{cq}^{1-i} = T_{cq}^t + \frac{(x^1 - x_t^1)T_{cq}^{t-1} - (x^1 - x_t^1)T_{cq}^t}{x_{t+1}^1 - x_t^1}, t = 1, 3, 5, \ldots, 31, \quad (5)$$

a second step: in 16 spatial coordinates obtained in the first step, any two spatial coordinates still at most has the same value in four dimensions, and one common dimension of two coordinates satisfying the condition is a value of the target combination, different dimensions of coordinate values of the two coordinates are denoted as $x_i^2$ and $x_{i+1}^2$, $x^2$ is used to represent a coordinate value of the target combination in the dimension, and one-dimensional linear interpolation is performed to obtain a new spatial coordinate and a corresponding propagation delay $T_{cq}^{2-j}$ of the register, $1 \leq j \leq 8$, and the formula is as follows:

$$T_{cq}^{2\_j} = T_{cq}^{1\_i} + \frac{(x^2 - x_i^2)T_{cq}^{1\_i+1} - (x^2 - x_i^2)T_{cq}^{1\_i}}{x_{i+1}^2 - x_i^2}, i = 1, 3, \ldots, 15, \quad (6)$$

a third step: in 8 spatial coordinates obtained in the second step, any two spatial coordinates still at most has the same value in four dimensions, and two common dimensions of two coordinates satisfying the condition are the value of the target combination, different dimensions of coordinate values of the two coordinates are denoted as $x_j^3$ and $x_{j+1}^3$, $x^3$ is used to represent a coordinate value of the target combination in the dimension, and one-dimensional linear interpolation is performed to obtain a new spatial coordinate and a corresponding propagation delay $T_{cq}^{3\_m}$ of the register, $1 \leq m \leq 4$, and the formula is as follows:

$$T_{cq}^{3\_m} = T_{cq}^{2\_j} + \frac{(x^3 - x_j^3)T_{cq}^{2\_j+1} - (x^3 - x_j^3)T_{cq}^{2\_j}}{x_{j+1}^3 - x_j^3}, j = 1, 3, \ldots, 7, \quad (7)$$

a fourth step: in 4 spatial coordinates obtained in the second step, any two spatial coordinates still at most has the same value in four dimensions, and three common dimensions of two coordinates satisfying the condition are the value of the target combination, different dimensions of coordinate values of the two coordinates are denoted as $x_m^4$ and $x_{m+1}^4$, $x^4$ is used to represent a coordinate value of the target combination in the dimension, and one-dimensional linear interpolation is performed to obtain a new spatial coordinate and a corresponding propagation delay $T_{cq}^{4\_n}$ of the register, $1 \leq n \leq 2$, and the formula is as follows:

$$T_{cq}^{4\_n} = T_{cq}^{3\_m} + \frac{(x^4 - x_m^4)T_{cq}^{3\_m+1} - (x^4 - x_m^4)T_{cq}^{3\_m}}{x_{m+1}^4 - x_m^4}, m = 1, 3, \quad (8)$$

a fifth step: two coordinates are obtained in the fourth step, the two coordinates only have different values in one dimension, and the values of the remaining four dimensions are the same as values of the target combination, dimensions with different coordinate values in the two coordinates are denoted as $x_n^5$ and $x_{n+1}^5$, $x^5$ is used to represent a coordinate value of the target combination in the dimension, and interpolation is performed on the dimensions with different coordinate values, to obtain an interpolation target $T_{cq}^{(i)s}$ is:

$$T_{cq}^{(i)s} = T_{cq}^{4\_n} + \frac{(x^5 - x_n^5)T_{cq}^{4\_n+1} - (x^5 - x_j^5)T_{cq}^{4\_n}}{x_{n+1}^5 - x_n^5}, n = 1. \quad (9)$$

In step S2, for all register paths in the circuit, the corresponding actual propagation delay $T_{cq}^{(i)s}$ is obtained by performing interpolation calculation by changing the setup slack $T_{setup}^{(j)s}$ and the hold slack $T_{hold}^{(j)s}$ of the end point register $FF^j$ and simultaneously changing the setup slack $T_{slack}^{(i)s}$ and the hold slack $T_{hold}^{(i)s}$ of the start point register $FF^i$, so that in a case that it is satisfied that the setup time margin $S_{setup}^{(i,j)s}$ and the hold time margin $S_{hold}^{(i,j)s}$ of each register path based on the flexible register timing library are greater than zero, the clock cycle can be changed to be minimal, that is, a minimum value of the clock cycle T is taken in a case that both (10) and (11) are satisfied, where change ranges of the setup slack and the hold slack of the start point register i and the end point register j satisfy (12) and (13).

$$S_{setup}^{(i,j)} \geq 0, \forall 1 \leq i,j \leq N_{FF} \quad (10),$$

$$S_{hold}^{(i,j)} \geq 0, \forall 1 \leq i,j \leq N_{FF} \quad (11),$$

$$T_{setup}^{s(min)} \leq T_{setup}^{(i)s}, T_{setup}^{(j)s} \leq T_{setup}^{s(max)}, \forall 1 \leq i,j \leq N_{FF} \quad (12), \text{ and}$$

$$T_{hold}^{s(min)} \leq T_{hold}^{(i)s}, T_{hold}^{(j)s} \leq T_{hold}^{s(max)}, \forall 1 \leq i,j \leq N_{FF} \quad (13).$$

In this embodiment, a data signal conversion time is set to 50 ps to 800 ps. Values are evenly taken in the range with a step size of 50 ps, and there are a total of 16 value points. A clock signal conversion time is set to 100 ps to 500 ps. Similarly, values are evenly taken in the range with a step size of 50 ps, and there are a total of 5 value points. A register load capacitance is set to 1 fF to 5 fF. Values are evenly taken in the range with a step size of 1 fF, and there are a total of 5 value points. 400 combinations may be obtained by combining the foregoing values in any manner.

For each combination, setup slack of a register is set to 3 ns, and hold slack is gradually reduced from 3 ns to 100 ps. The hold slack when a propagation delay of the register just starts to increase and the hold slack when simulation fails are recorded. That is, a range of the hold slack is recorded, and is 200 ps to 1000 ps. The hold slack of the register is set to 3 ns. The setup slack is gradually reduced from 3 ns to 100 ps. The setup slack when the propagation delay of the register just starts to increase and the setup slack when simulation fails are recorded. That is, a range of the setup slack is recorded, and is 200 ps to 1000 ps. Values are taken for the setup slack and the hold slack with a step size of 20 ps. There are a total of 1296 combinations. The propagation delays of the register under all combinations are obtained through simulation.

To obtain the propagation delay of the register under that the data signal conversion time is 153 ps, the clock signal conversion time is 247 ps, the register load capacitance is 2.1 fF, the setup slack is 284 ps, and the hold slack is 384 ps, first, a combination that the data signal conversion time is 150 ps, the clock signal conversion time is 200 ps, the register load capacitance is 2 fF, and the setup slack and the hold slack are respectively 280 ps and 380 ps and a combination that the data signal conversion time is 200 ps, the clock signal conversion time is 250 ps, the register load capacitance is 3 fF, and the setup slack and the hold slack are respectively 300 ps and 400 ps are selected from the foregoing combinations. Linear interpolation is performed by using these data as interpolation points to obtain the propagation delay of the register under a target combination.

Figure 3:
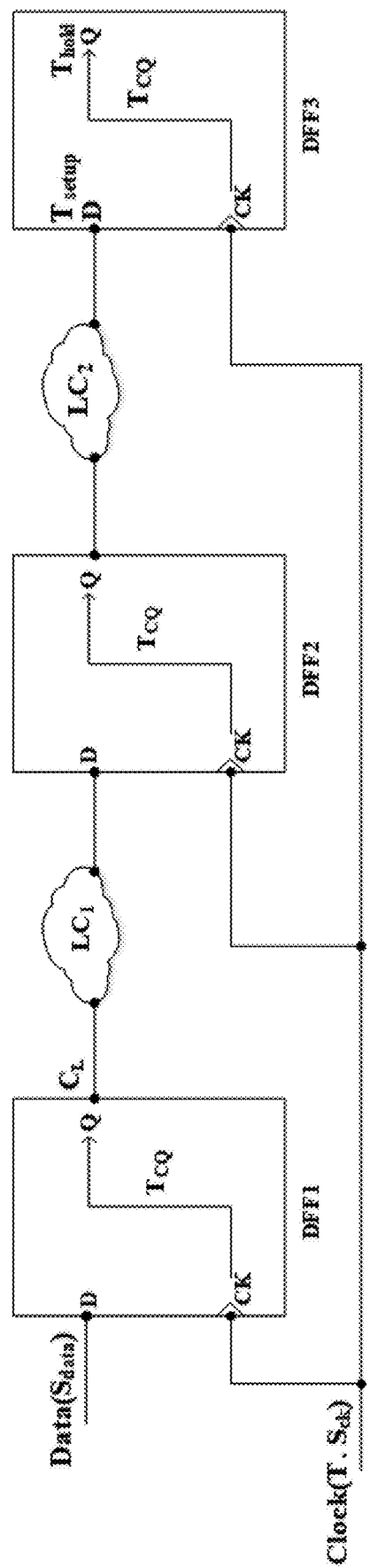
FIG. 3 is a schematic diagram of adjacent register paths.

Connection paths of registers in FIG. 3 are used for description. A cycle of a clock signal is 5 ns. No setup time violation occurs in a path from a register DFF1 to a register DFF2. A setup time margin of the path is 0.785 ns. A setup time violation occurs in a path from the register DFF2 to a register DFF3. A setup time margin is −0.917 ns. For the register DFF1, a setup time $T_{setup}^{(1)}$ is 422 ps, a hold time $T_{hold}^{(1)}$, is 300 ps, an input signal conversion time $S_{data}^{(1)}$ is 307 ps, a clock signal conversion time $S_{ck}^{(1)}$ is 181 ps, a register load capacitance $C_L^{(1)}$ is 2 fF, and a corresponding propagation delay of the register $T_{cq}^{(1)}$ is 2.066 ns. For the register DFF2, a setup time $T_{setup}^{(2)}$ is 457 ps, a hold time $T_{hold}^{(2)}$ is 213 ps, an input signal conversion time $S_{data}^{(2)}$ is 160 ps, a clock signal conversion time $S_{ck}^{(2)}$ is 197 ps, a register load capacitance $C_L^{(2)}$ is 2fF, and a corresponding propagation delay of the register $T_{cq}^{(2)}$ is 1.818 ns. For the register DFF3, a setup time $T_{setup}^{(3)}$ is 388 ps, a hold time $T_{hold}^{(3)}$, is 100 ps, an input signal conversion time $S_{data}^{(3)}$, is 267 ps, a clock signal conversion time $S_{ck}^{(3)}$ is 224 ps, a register load capacitance $C_L^{(3)}$ is 2fF, and a corresponding propagation delay of the register $T_{cq}^{(3)}$ is 2.038 ns. The input signal conversion time, the clock signal conversion time, and the register load capacitance of the three registers are respectively kept unchanged. The setup slack $T_{setup}^{s(1)}$ and the hold slack $T_{hold}^{s(1)}$ of DFF1 are respectively 930 ps and 500 ps, and interpolation is performed by using a flexible register timing library to obtain the corresponding actual propagation delay $T_{cq}^{s(1)}$ of the register is 2.065 ns under the values. The setup slack $T_{setup}^{s(2)}$ and the hold slack $T_{hold}^{s(2)}$ of DFF2 are respectively 950 ps and 950 ps, and interpolation is performed by using a flexible register timing library to obtain the corresponding actual propagation delay $T_{cq}^{s(2)}$ of the register is 1.533 ns under the values. The setup slack $T_{setup}^{s(3)}$ and the hold slack $T_{hold}^{s(3)}$ of DFF3 are respectively 300 ps and 540 ps, and interpolation is performed by using a flexible register timing library to obtain the corresponding actual propagation delay $T_{cq}^{s(3)}$ of the register is 3.082 ns under the values. The foregoing values change the setup time margins of the path from the register DFF1 to the register DFF2 and the path from the register DFF2 to the register DFF3 to 893 ps and 56 ps respectively, thereby eliminating a timing violation. In this case, it can be obtained that a minimum value $T^{min}$ of the clock cycle is 5.6 ns. Compared with that a clock cycle minimum value required for eliminating a timing violation is 5.917 ns based on a conventional register timing library, a decrease of 5.4% is reached.

The foregoing is only preferred implementations of the present invention. It should be pointed out that for a person of ordinary skill in the art that several improvements and modifications may be further made without departing from the principle of the present invention, and these improvements and modifications shall also be construed as falling within the protection scope of the present invention.

What is claimed is:

1. A method for optimizing circuit timing based on a flexible register timing library, wherein a setup time $T_{setup}$, a hold time $T_{hold}$, and a propagation delay $T_{cq}$ of a register respectively refer to a shortest time within which input data needs to be kept stable before a clock signal jump, a shortest time within which the input data needs to be kept stable after the clock signal jump, and a time interval from the clock signal jump to output data under a specific combination of an input signal conversion time $S_{data}$, a clock signal conversion time $S_{ck}$, and a register load capacitance $C_L$ in a conventional register timing library;

setup slack $T_{setup}^{s}$, hold slack $T_{hold}^{s}$, and an actual propagation delay $T_{cq}^{s}$, of the register respectively refer to a time within which the input data is actually kept stable before the clock signal jump, a time within which the input data is actually kept stable after the clock signal jump, and a time interval from the clock signal jump to the output data in a case of specific setup slack $T_{setup}^{s}$, and hold slack $T_{hold}^{s}$, under the specific combination of the input signal conversion time $S_{data}$, the clock signal conversion time $S_{ck}$, and the register load capacitance $C_L$;

the flexible register timing library refers to a plurality of corresponding different combinations of the setup slack $T_{setup}^{s}$, the hold slack $T_{hold}^{s}$, and the actual propagation delay $T_{cq}^{s}$, under the specific combination of the input signal conversion time $S_{data}$, the clock signal conversion time $S_{ck}$, and the register load capacitance $C_L$;

a register path refers to a data path with registers as a start point and an end point in a circuit, wherein a start point register is denoted as $FF^i$, an end point register is denoted as $FF^j$, i and j are respectively sequence numbers of the start point register and the end point register, $1 \leq i,j \leq N_{FF}$, and $N_{FF}$ is a quantity of registers in the circuit;

for a register path between the start point register $FF^i$ and the end point register $FF^j$, a setup time margin $S_{setup}^{(i,j)}$ and a hold time margin $S_{hold}^{(i,j)}$ based on the conventional register timing library are respectively (1) and (2) as follows:

$$S_{setup}^{(i,j)} = T_{ck}^{(j)} + T - T_{setup}^{(j)} - T_{ck}^{(i)} - T_{cq}^{(i)} - T_{path}^{(i,j)max} \quad (1), \text{ and}$$

$$S_{hold}^{(i,j)} = T_{ck}^{(i)} + T_{cq}^{(i)} + T_{path}^{(i,j)min} - T_{ck}^{(j)} - T_{hold}^{(j)} \quad (2),$$

wherein T represents a clock cycle, $T_T^{(i)}$ and $T_{ck}^{(j)}$ respectively represent a time for a clock signal to reach the start point register $FF^i$ and a time for the clock signal to reach the end point register $FF^j$, $T_{path}^{(i,j)max}$ and $T_{path}^{(i,j)min}$ respectively represent the start point register $FF^i$ and the end point register $FF^j$ between a maximum delay and a minimum delay of the data path in all register paths, $T_{setup}^{(j)}$ and $T_{hold}^{(j)}$ respectively represent a setup time and a hold time of the end point register $FF^j$, and $T_{cq}^{(i)}$ represents a propagation delay of the start point register $FF^i$;

for the register path between the start point register $FF^i$ and the end point register $FF^j$, a setup time margin $S_{setup}^{(i,j)s}$ and a hold time margin $S_{hold}^{(i,j)s}$ based on the flexible register timing library are respectively (3) and (4) as follows:

$$S_{setup}^{(i,j)s} = T_{ck}^{(j)} + T - T_{setup}^{(j)s} - T_{ck}^{(i)} - T_{cq}^{(i)s} - T_{path}^{(i,j)max} \quad (3), \text{ and}$$

$$S_{hold}^{(i,j)s} = T_{ck}^{(i)} + T_{cq}^{(i)s} + T_{path}^{(i,j)min} - T_{ck}^{(j)} - T_{hold}^{(j)s} \quad (4),$$

wherein $T_{setup}^{(j)}$ and $T_{hold}^{(j)s}$ respectively represent setup slack and hold slack of the end point register $FF^j$, and $T_{cq}^{(i)s}$ represents an actual propagation delay of the start point register $FF^i$, and changes along with the setup slack and the hold slack of the register; and the method comprises:

S1: for all registers in the circuit, determining ranges of the input signal conversion time $S_{data}$, the clock signal conversion time $S_{ck}$, and the register load capacitance $C_L$, of the registers, selecting a plurality of combinations of the input signal conversion time, the clock signal conversion time, and the register load capacitance from the ranges, and performing simulation to obtain all valid setup slack and hold slack, and corresponding actual propagation delays; and S2: for all register paths in the circuit, changing the setup slack and the hold slack of each of the start point registers and end point registers according to the input signal conversion time $S_{data}$, the clock signal conversion time $S_{ck}$, and the register load capacitance $C_L$, of the start point register or the end point register, and minimizing the clock cycle in a case that it is satisfied that the setup time margin and the hold time margin of each register path based on the flexible register timing library are both greater than zero, wherein in step S1, for each combination of the input signal conversion time, the clock signal conversion time, and the register load capacitance in the conventional register timing library, is determined that valid ranges of the setup slack $T_{setup}^{s}$ and the hold slack $T_{hold}^{s}$ are $T_{setup}^{s(min)} \leq T_{setup}^{s} \leq T_{setup}^{s(max)}$ and $T_{hold}^{s(min)} \leq T_{hold}^{s} \leq T_{hold}^{s(max)}$, and a specific method is: first, performing simulation by taking sufficiently large values of the setup slack $T_{setup}^{s}$ and the hold slack $T_{hold}^{s}$ to obtain a corresponding actual propagation delay $T_{cq}^s$, where the sufficiently large value refers to that $T_{cq}^s$ no longer decreases when $T_{setup}^s$ or $T_{hold}^s$ continues to increase; then, performing simulation by keeping $T_{hold}^s$ unchanged and reducing $T_{setup}^s$ until $T_{cq}^s$ starts to increase, where in this case, corresponding $T_{setup}^s$ is $T_{setup}^{s(max)}$; performing simulation by keeping $T_{setup}^s$ unchanged and reducing $T_{hold}^s$, until $T_{cq}^s$ starts to increase, where in this case, corresponding $T_{hold}^s$ is $T_{hold}^{s(max)}$; then, performing simulation by keeping $T_{hold}^s$ unchanged and continuing to reduce $T_{hold}^s$, where $T_{cq}^s$ continues to increase until simulation fails, that is, the output data cannot be obtained during the clock signal jump of the register, and in this case, corresponding $T_{setup}^s$ is $T_{setup}^{s(min)}$; and performing simulation by keeping $T_{setup}^s$ unchanged and continuing to reduce $T_{hold}^s$, where $T_{cq}^s$ continues to increase until simulation fails, and in this case, corresponding $T_{hold}^s$ is $T_{hold}^{s(min)}$, and wherein simulation is performed in the valid ranges of $T_{setup}^s$ and $T_{hold}^s$ to obtain corresponding $T_{cq}^s$ under all valid combinations of $T_{setup}^s$ and $T_{hold}^s$, and a specific method is: first, selecting simulation points from the valid ranges of $T_{setup}^s$ and $T_{hold}^s$ with $T_{step}$ as an interval, wherein $N_{setup} T_{setup}^s$ simulation points are provided, and are respectively $T_{setup}^{s(min)} + n_{setup} \times T_{step}$, wherein $0 \le n_{setup} \le N_{setup} - 1$, $n_{setup}$ is an $n^{th} T_{setup}^s$ simulation point, $N_{setup}$ is a maximum positive integer satisfying $T_{setup}^{s(min)} + (N_{setup} - 1) \times T_{step} \le T_{setup}^{s(max)}$, $N_{hold} T_{hold}^s$ simulation points are provided, and are respectively $T_{hold}^{s(min)} + n_{hold} \times T_{hold}$, wherein $0 \le n_{hold} \le N_{hold} - 1$, $n_{hold}$ is an $n^{th} T_{hold}^s$ simulation point, and $N_{hold}$ is a maximum positive integer satisfying $T_{hold}^{s(min)} + (N_{hold} - 1) \times T_{step} \le T_{hold}^{s(max)}$; and then, combining the $N_{setup} T_{setup}^s$ simulation points and the $N_{hold} T_{hold}^s$ simulation points two by two, and performing simulation under all combinations to obtain corresponding $T_{cq}^s$.

2. The method for optimizing circuit timing based on a flexible register timing library according to claim 1, wherein in step S2, for all register paths in the circuit, timing analysis is performed by using the conventional register timing library, to obtain the clock cycle T of the circuit, and for the register path between the start point register $FF^i$ and the end point register $FF^j$, the setup time margin $S_{setup}^{(i,j)}$ and the hold time $S_{hold}^{(i,j)}$, the maximum delay $T_{path}^{(i,j)max}$ and the minimum delay $T_{path}^{(i,j)min}$ of the data path, the setup time $T_{setup}^{(j)}$ and the hold time $T_{hold}^{(j)}$ of the end point register $FF^j$, a propagation delay $T_{cq}^{(i)}$ of the start point register $FF^i$, an input signal conversion time $S_{data}^{(i)}$, a clock signal conversion time $S_{ck}^{(i)}$, and a load capacitance $C_L^{(i)}$ of the start point register $FF^i$, and an input signal conversion time $S_{data}^{(j)}$, the clock signal conversion time $S_{ck}^{(j)}$, and the load capacitance $C_L^{(j)}$ of the end point register j are obtained;

when setup slack and hold slack of the start point register $FF^i$ obtained by performing interpolation calculation according to all the input signal conversion time, clock signal conversion time, and register load capacitances in the conventional register timing library and all the valid setup slack and hold slack and the corresponding actual propagation delays obtained through simulation in step S1 are respectively $T_{setup}^{(i)s}$ and $T_{hold}^{(i)s}$, the corresponding actual propagation delay is $T_{cq}^{(i)s}$ and a specific process is:

first, an input signal conversion time $\underline{S}_{data}$ that is closest to $S_{data}^{(i)}$ and is less than $S_{data}^{(i)}$, a clock signal conversion time $\underline{S}_{ck}$ that is closest to $S_{ck}^{(i)}$ and is less than $S_{ck}^{(i)}$, and a load capacitance $\underline{C}_L$ that is closest to $C_L^{(i)}$ and is less than $C_L^{(i)}$ in the conventional register timing are selected; and an input signal conversion time $\overline{S}_{data}$ that is closest to $S_{data}^{(i)}$ and is greater than $S_{data}^{(i)}$, a clock signal conversion time $\overline{S}_{ck}$ that is closest to $S_{ck}^{(i)}$ and is greater than $S_{ck}^{(i)}$, and a load capacitance $\overline{C}_L$ that is closest to $C_L^{(i)}$ and is greater than $C_L^{(i)}$ in the conventional register timing are selected;

then, when the setup slack and the hold slack of the register $FF^i$ are respectively $T_{setup}^{(i)s}$ and $T_{hold}^{(i)s}$, setup slack $\underline{T}_{setup}^s$ that is closest to $T_{setup}^{(i)s}$ and is less than $T_{setup}^{(i)s}$ in the $N_{setup} T_{setup}^s$ simulation points is selected, and setup slack $\underline{T}_{hold}^s$ that is closest to $T_{hold}^{(i)s}$ and is less than $T_{hold}^{(i)s}$ in the $N_{hold} T_{hold}^s$ simulation points is selected; and setup slack $\overline{T}_{setup}^s$ that is closest to $T_{cq}^{(i)s}$ and is greater than $T_{setup}^{(i)s}$ in the $N_{setup} T_{setup}^s$ simulation points is selected, and setup slack $\overline{T}_{hold}^s$ that is closest to $T_{hold}^{(i)s}$ and is greater than $T_{hold}^{(i)s}$ in the $N_{hold} T_{hold}^s$ simulation points is selected; and finally the corresponding actual propagation delay $T_{cq}^{(i)s}$ of the register $FF^i$ when the input signal conversion time is $S_{data}^{(i)}$, the clock signal conversion time is $S_{ck}^{(i)}$, the register load capacitance is $C_L^{(i)}$, the setup slack is $T_{setup}^{(i)s}$, and the hold slack $T_{hold}^{(i)s}$ is obtained in a linear interpolation mode according to the actual propagation delays of the register in a total of 32 cases in which the input signal conversion time is respectively $\underline{S}_{data}$ and $\overline{S}_{data}$, the clock signal conversion time is respectively $\underline{S}_{ck}$ and $\overline{S}_{ck}$, the register load capacitance is respectively $\underline{C}_L$ and $\overline{C}_L$, the setup slack is respectively $\underline{T}_{setup}^s$, and $\overline{T}_{setup}^s$, and the hold slack is respectively $\underline{T}_{hold}^s$ and $\overline{T}_{hold}^s$.

3. The method for optimizing circuit timing based on a flexible register timing library according to claim 2, wherein in step S2, for all register paths in the circuit, the corresponding actual propagation delay $T_{cq}^{(i)s}$ is obtained by performing interpolation calculation by changing the setup slack $T_{cq}^{(j)s}$ and the hold slack $T_{hold}^{(j)s}$ of the end point register $FF^j$ and simultaneously changing the setup slack $T_{setup}^{(i)s}$ and the hold slack $T_{hold}^{(i)s}$ of the start point register $FF^i$, so that in a case that it is satisfied that the setup time margin $S_{setup}^{(i,j)s}$ and the hold time margin $S_{hold}^{(i,j)s}$ of each register path based on the flexible register timing library are greater than zero, the clock cycle can be changed to be minimal, that is, a minimum value of the clock cycle T is taken.

4. The method for optimizing circuit timing based on a flexible register timing library according to claim 2, wherein the linear interpolation mode is specifically:

a first step: each combination of the 32 combinations and a target combination are considered as one spatial coordinate, any two spatial coordinates at most has four same coordinate values, propagation delays of the register corresponding to two coordinates in this case are denoted as $T_{cq}^t$ and $T_{cq}^{(t-1)}$, one-dimensional linear interpolation is performed on each pair in a different dimension of the coordinate values, the pair are respectively denoted as $x_t^1$ and $x_{t-1}^1$ in the different dimension, and $x^1$ is used to represent a coordinate value of the target combination in the dimension, to obtain a new interpolation coordinate and a delay $T_{cq}^{(1-i)}$ of the register corresponding to the interpolation coordinate, $1 \le i \le 16$, and the formula is as follows:

$$T_{cq}^{1-i} = T_{cq}^t + \frac{(x^1 - x_t^1)T_{cq}^{t+1} - (x^1 - x_t^1)T_{cq}^t}{x_{t+1}^1 - x_t^1}, t = 1, 3, 5, \ldots, 31, \quad (5)$$

a second step: in 16 spatial coordinates obtained in the first step, any two spatial coordinates still at most has the same value in four dimensions, and one common dimension of two coordinates satisfying the condition is a value of the target combination, different dimensions of coordinate values of the two coordinates are denoted as $x_i^2$ and $x_{i-1}^2$, $x^2$ is used to represent a coordinate value of the target combination in the dimension, and one-dimensional linear interpolation is performed to obtain a new spatial coordinate and a corresponding propagation delay $T_{cq}^{(2\_i)}$ of the register, $1 \leq j \leq 8$, and the formula is as follows:

$$T_{cq}^{2\_j} = T_{cq}^{1\_i} + \frac{(x^2 - x_i^2)T_{cq}^{1\_i+1} - (x^2 - x_i^2)T_{cq}^{1\_i}}{x_{i+1}^2 - x_i^2}, i = 1, 3, \ldots, 15, \quad (6)$$

a third step: in 8 spatial coordinates obtained in the second step, any two spatial coordinates still at most has the same value in four dimensions, and two common dimensions of two coordinates satisfying the condition are the value of the target combination, different dimensions of coordinate values of the two coordinates are denoted as $x_j^3$ and $x_{j-1}^3$, $x^3$ is used to represent a coordinate value of the target combination in the dimension, and one-dimensional linear interpolation is performed to obtain a new spatial coordinate and a corresponding propagation delay $T_{cq}^{(3\_m)}$ of the register, $1 \leq m \leq 4$, and the formula is as follows:

$$T_{cq}^{3\_m} = T_{cq}^{2\_j} + \frac{(x^3 - x_j^3)T_{cq}^{2\_j+1} - (x^3 - x_j^3)T_{cq}^{2\_j}}{x_{j+1}^3 - x_j^3}, j = 1, 3, \ldots, 7, \quad (7)$$

a fourth step: in 4 spatial coordinates obtained in the second step, any two spatial coordinates still at most has the same value in four dimensions, and three common dimensions of two coordinates satisfying the condition are the value of the target combination, different dimensions of coordinate values of the two coordinates are denoted as $x_m^4$ and $x_{m-1}^4$, $x^4$ is used to represent a coordinate value of the target combination in the dimension, and one-dimensional linear interpolation is performed to obtain a new spatial coordinate and a corresponding propagation delay $T_{cq}^{(4\_n)}$ of the register, $1 \leq n \leq 2$, and the formula is as follows:

$$T_{cq}^{4\_n} = T_{cq}^{3\_m} + \frac{(x^4 - x_m^4)T_{cq}^{3\_m+1} - (x^4 - x_m^4)T_{cq}^{3\_m}}{x_{m+1}^4 - x_m^4}, m = 1, 3, \quad (8)$$

and a fifth step: two coordinates are obtained in the fourth step, the two coordinates only have different values in one dimension, and the values of the remaining four dimensions are the same as values of the target combination, dimensions with different coordinate values in the two coordinates are denoted as $x_n^5$ and $x_{n-1}^5$, $x^5$ is used to represent a coordinate value of the target combination in the dimension, and interpolation is performed on the dimensions with different coordinate values, to obtain an interpolation target $T_{cq}^{(i)s}$:

$$T_{cq}^{(i)s} = T_{cq}^{4\_n} + \frac{(x^5 - x_n^5)T_{cq}^{4\_n+1} - (x^5 - x_j^5)T_{cq}^{4\_n}}{x_{n+1}^5 - x_n^5}, n = 1. \quad (9)$$

\* \* \* \* \*